United States Patent [19]

Park

[11] Patent Number: 5,661,844

[45] Date of Patent: Aug. 26, 1997

[54] DEVICE FOR DISPLAYING REMAIN TIME OF A PROGRAM RECORDED ON VCR TAPE

[75] Inventor: Seung Cheol Park, Seoul, Rep. of Korea

[73] Assignee: Goldstar Co., Ltd., Rep. of Korea

[21] Appl. No.: 446,089

[22] Filed: May 19, 1995

Related U.S. Application Data

[63] Continuation-in-part of Ser. No. 183,376, Jan. 19, 1994, abandoned.

[30] Foreign Application Priority Data

Jan. 21, 1993 [KR] Rep. of Korea ............... 1993-739

[51] Int. Cl.$^6$ ............................................. H04N 5/76
[52] U.S. Cl. ............................. 386/46; 386/95; 386/60
[58] Field of Search ............................ 358/335, 342; 360/13, 14.1, 14.3, 137; 348/461, 468; 386/46, 95, 60, 65, 102; H04N 5/76

[56] References Cited

U.S. PATENT DOCUMENTS

| | | | |
|---|---|---|---|
| 4,338,645 | 7/1982 | Mohri et al. | 360/137 |
| 4,916,682 | 4/1990 | Tomoda et al. | 360/13 |
| 5,018,040 | 5/1991 | Nishida | 360/137 |
| 5,097,348 | 3/1992 | Suetaka | 358/335 |
| 5,206,767 | 4/1993 | Heep | 360/13 |
| 5,315,452 | 5/1994 | Hong | 358/335 |

*Primary Examiner*—Thai Tran
*Assistant Examiner*—Huy Nguyen

[57] ABSTRACT

A device for recording and reading a length of use of VCR tape provided to record an information on a length of recording period time and detect the information to use the tape efficiently. It is possible to record a time information of a record length mixed with video signals at a preset point when video signals are recorded on tape, and when reproduced, the time information can be detected and read to obtain the remaining reproduction length, which length can be displayed on a monitor by mixing with the video signals at a preset displaying point. It can offer a convenience to user by displaying the remaining length of a reproduction.

6 Claims, 4 Drawing Sheets

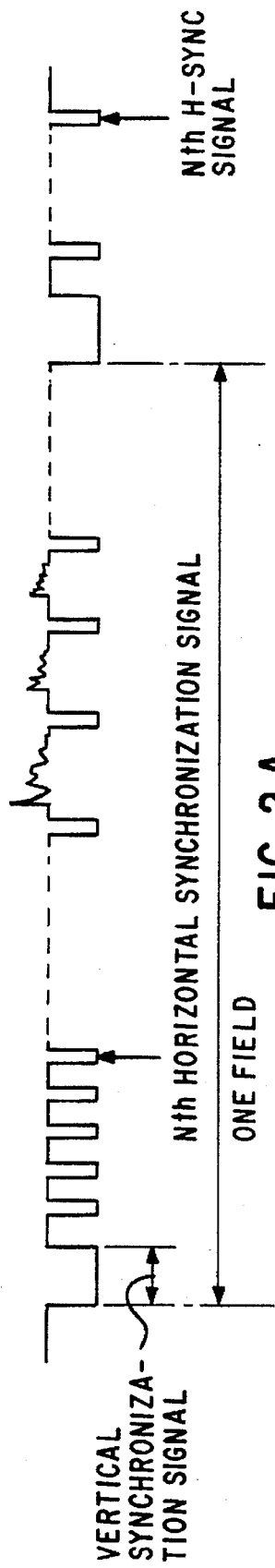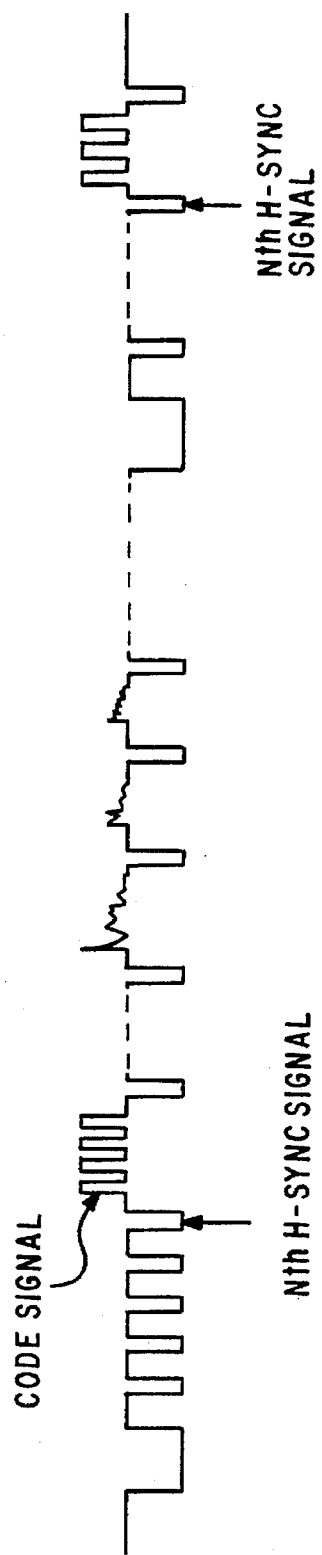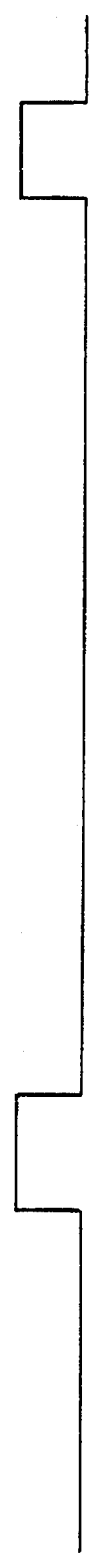
FIG. 2A
FIG. 2B
FIG. 2C

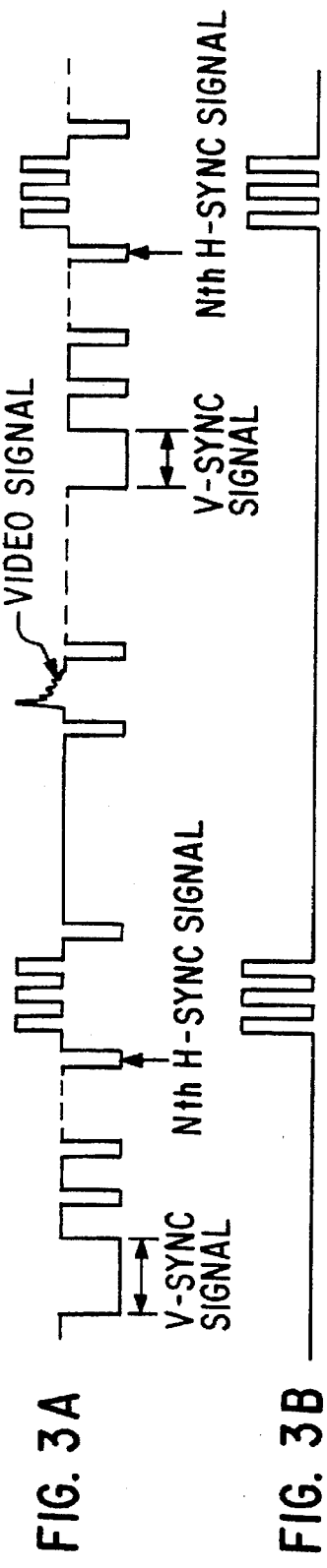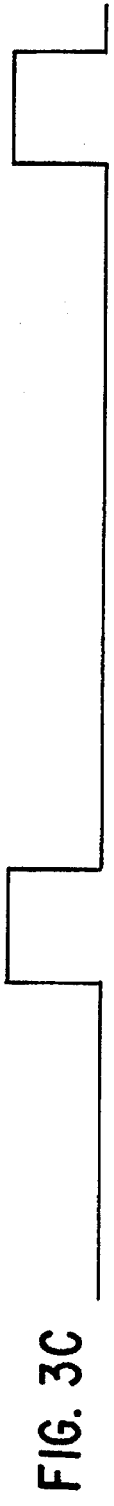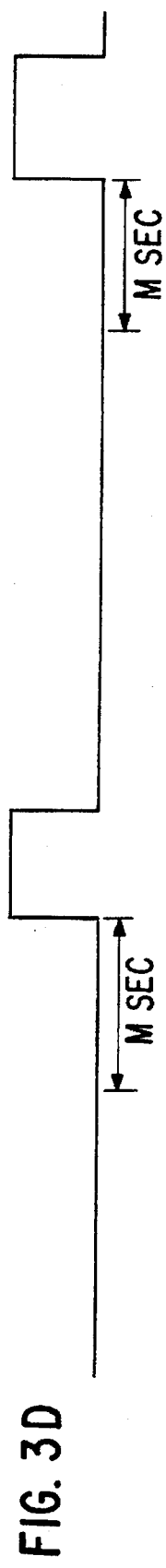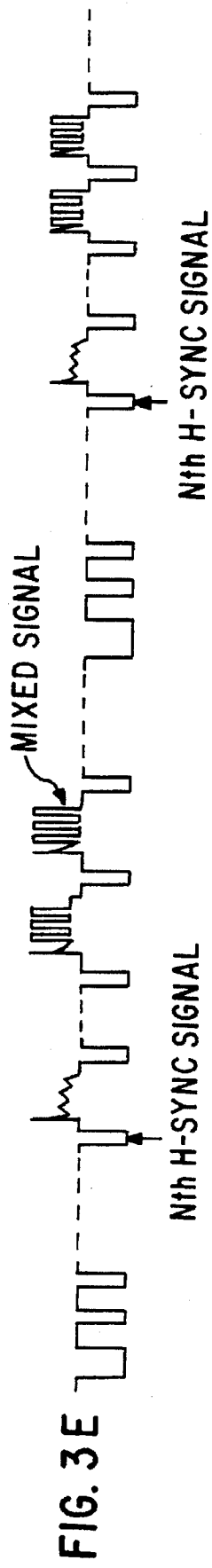
FIG. 3A
FIG. 3B
FIG. 3C
FIG. 3D
FIG. 3E

DEVICE FOR DISPLAYING REMAIN TIME OF A PROGRAM RECORDED ON VCR TAPE

RELATED APPLICATION DATA

This invention is a continuation-in-part of U.S. patent application Ser. No. 08/183,376, filed Jan. 19, 1994, abandoned, which is hereby incorporated by reference.

FIELD OF THE INVENTION

This invention relates to a VCR (Video Cassette Recorder), more particularly to a device for recording and reading a program running information recorded on VCR tape provided to record an information on a length of recording period time and detect the information to use the tape efficiently.

BACKGROUND OF THE INVENTION

Generally, a run length of tape is shown on a counter in a VCR. When a tape runs, reel pulses generated from a reel sensor are checked, and the run length as well as a remaining length can be given by carrying out counting according to a direction of the tape run. Such a length of run can be represented by a length of time.

However, such an art has a problem that, though a physical length of run, a remaining length of the tape can be given but, an actual length of a program recorded cannot be known.

SUMMARY OF THE INVENTION

The object of this invention is to provide a device for recording and reading a program running information recorded on VCR tape which allows that a recorded length of a program recorded on VCR tape can be given easily.

Another object of this invention is to provide a device for recording and reading a program running information recorded on VCR tape which allows that a remaining length of a program recorded on VCR tape can be given easily at any part of the tape.

These and other objects and the features of this invention can be achieved by providing a device for recording and reading a length of use of VCR tape and start time and end time of a program including a program remaining length detection part for detecting a remaining length from the present part to an end of program, a microcomputer for generating a control signal in response to a key signal, a first switching part for selecting one kind of video signals of video signal to be recorded and video signal to be reproduced in response to the control signal of the microcomputer, a mixer part for mixing information signals corresponding to the control signal of the microcomputer and the video signal selected in the first switching part, a second switching part for selecting one output terminal of two output terminals to transmit output signals of the mixer part in response to the control signals of the microcomputer, a record processing part connected to one of the output terminal of the second switching part for processing the output signal of the mixer part into a recordable condition on the tape, a monitor connected to another output terminal of the second switching part for displaying the output signals of the mixer part, a reproduction processing part for reproducing the video signal recorded on the tape, a horizontal synchronization signal detection part for sampling the video signal after a Nth horizontal synchronization signal of the video signals reproduced in the reproduction processing part, a decoder part for reading the video signals sampled in the horizontal synchronization signal detection part, a synchronization separation part for detecting vertical synchronization signals and horizontal synchronization signals of the video signals transmitted from the mixer part, a control signal generation part for generating a control signal on incoming of the Nth horizontal synchronization signal after the vertical synchronization signal, a delaying part for delaying the control signal of the control signal generation part for a preset period of time, and a third switching part for selecting a control signal of the control signals delayed by the delaying part and generated in the control signal generation part in response to the control signal of the microcomputer and transmitting the selected signal to the microcomputer.

BRIEF DESCRIPTION OF THE DRAWINGS

FIG. 2(A) to 2(C) show wave patterns of various parts on recording operation of the device in FIG. 1.

FIGS. 3(A) to 3(E) show wave patterns of various parts on recording operation of the device in FIG. 1.

DETAILED DESCRIPTION OF THE INVENTION

An embodiment of this invention it to be explained in detail hereinafter, referring to attached drawings.

Figure 1:
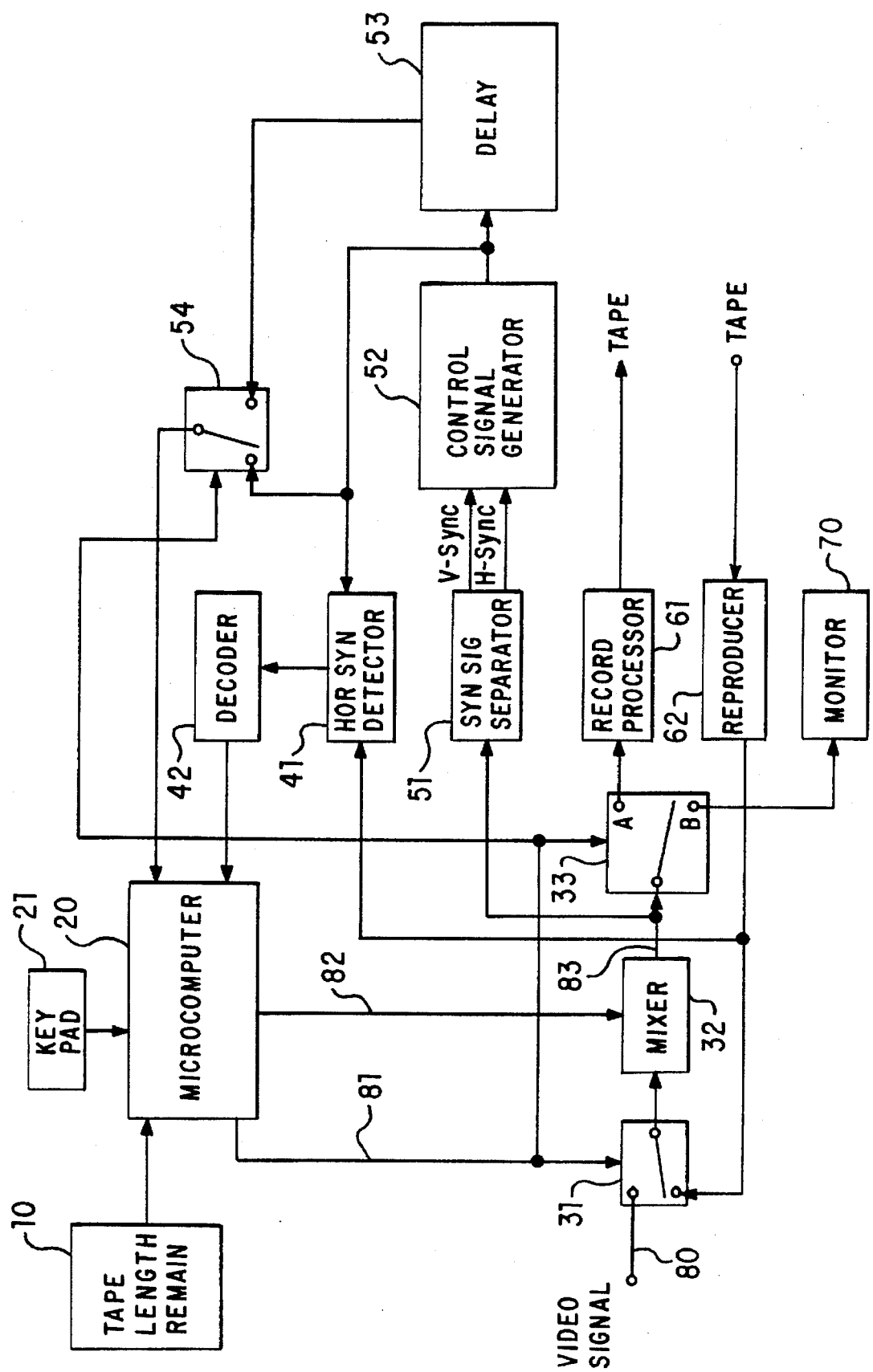
FIG. 1 shows a block diagram of a device for recording and reading a length of use of VCR tape in accordance with this invention.

FIG. 1 shows a block diagram of a device for recording and reading a program running information recorded on VCR tape in accordance with this invention including a the program remaining length detection part 10 for detecting a remaining length from the present part to an end of the program, a microcomputer 20 for generating control signals in response to key signals such as recording key signal, reproduction key signal, of a key pad, a first switching part 31 for selecting a video signal on a line 80 of the video signals to be recorded and the video signal to be reproduced in response to the control signal of the microcomputer 20, a mixer part 32 for mixing an information corresponding to the control signal of the microcomputer and the video signal selected in the first switching part 31, a second switching part 33 for selecting one output terminal of the output terminals A and B to transmit the output signals of the mixer part 32 in response to the control signal of the microcomputer 20, a record processing part 61 connected to the output terminal A of the second switching part 33 for processing (for example, modulation of frequency) the output signals of the mixer part 32 into a recordable condition on the tape, a monitor 70 connected to the output terminal B of the second switching part 33 for displaying the output signals of the mixer part 32, a reproduction processing part 62 for reproducing the video signals recorded in the tape, a horizontal synchronization signal detection part 41 for sampling the video signals after the Nth horizontal synchronization signal of the video signals reproduced in the reproduction processing part 62, a decoder part 42 for reading the video signals sampled in the horizontal synchronization signal detection part 41, a synchronization signal separation part 51 for detecting the vertical synchronization signals and the horizontal synchronization signals of the video signals transmitted from the mixer part 32, a control signal generation part 52 for generating a control signal on incoming of the Nth horizontal synchronization signal after a vertical synchronization signal, a delaying part 53 for delaying the control signals of the control signal generation part 52 for a preset period of time, and a third switching part 54 for selecting the control signal delayed by the delaying part 53 and the control signal generated in the control signal generation part 52 in response to the control signal of the microcomputer 20 and transmitting the selected control signal to the microcomputer 20.

When a key signal (a preset recording key signal or a recording key signal) is applied to the microcomputer 20 through the key pad 21 and the tape length remain information is inputted to the Microcomputer 20 through the tape length remain detecting part 10, the microcomputer 20 generates a control signal on a line 80 for carrying out a recording mode, and a code signal on a line 82 Corresponding to a recording period of time.

In response to the control signal of the microcomputer 20, the first switching part 31 selects the video signals to be recorded, the second switching part 33 selects the output terminal A connected to the record processing part 61, and the third switching part 54 selects the output signal of the control signal generation part 52.

The code signals of the microcomputer 20 is mixed with the video signal in one part of the video signals to be recorded in the mixer part. Presetting of the mixing part is to be explained referring to FIGS. 2(A) to 2(C).

The synchronization separation part 51 detects the vertical synchronization signals and the horizontal synchronization signals of the video signals (the wave pattern in FIG. 2(A)), and the control signal generation part 52 generates a control signal on incoming of the Nth horizontal synchronization signal after a vertical synchronization signal, (the wave pattern in FIG. 2(C)).

The control signals of the control signal generation part 52, selected by the third switching part 54, is applied to the microcomputer 20, and the microcomputer 20 transmits the code signal synchronized to the control signal of the control signal generation part 52 to the mixer part, which mixer part 32 mixes the code signal with the video signal of the Nth horizontal Synchronization signal section (the wave pattern in FIG. 2(B)).

Thus, the video signals being recorded are recorded on the tape after being modulated of the frequency by the record processing part 61 loaded after the Nth horizontal synchronization signal.

On the other hand, when a key signal (reproduction key signal) is applied to the microcomputer 20 through the key pad 21, the microcomputer generates a control signal for carrying out a reproduction mode. According to the control signal of the microcomputer, the first switching part 31 selects the reproduction video signal of the reproduction processing part 62, the second switching part 33 selects the output terminal 13 connected to the monitor 70, and the third switching part 54 selects the output signal of the delaying part 53 delaying the output signal of the control signal generation part 52.

In this time, when a reproduction remaining length key signal giving a reproduction remaining length of tape is applied, the synchronization separation part 51 detects the horizontal synchronization signal and the vertical synchronization signal of the reproduction video signal (the wave pattern in FIG. 3(A)) passed through the mixer part 32.

The control signal generation part 52 generates a control signal (the wave pattern in FIG. 3(C)) on incoming of the Nth horizontal synchronization signal after a vertical synchronization signal, and the delaying part 53 delays the control signal of the control signal generation part 52 for a preset period of time, (the wave pattern in FIG. 3(D)) to apply to the third switching part 54. The control signal thus delayed is selected by the third switching part 54 to be applied to the microcomputer 20, and the microcomputer 20 generates a displayable remaining length read signal in response to the delayed control signal of the delaying part 53, and controls the mixer part 32 to mix the read signal with the reproduction video signal (the wave pattern in FIG. 3(E)).

The remaining length read signal generated in the microcomputer 20 can be obtained through the horizontal synchronization signal detection part 41 and the decoder part 42. That is, the horizontal synchronization signal detection part 41 detects and samples the Nth horizontal synchronization signal of the reproduced video signals (the wave pattern in FIG. 3(B)), and the decoder part 42 reads out the code signal mixed on recording from the sampled signal to obtain the information of recording period of time. The read information of the decoder part 42, by the microcomputer 20, mixes with the reproduced video signal in the mixer part 32, is controlled to be displayable on the monitor 70, and is displayed on the monitor 70 when a reproduction remaining key signal is applied.

Figure 4:
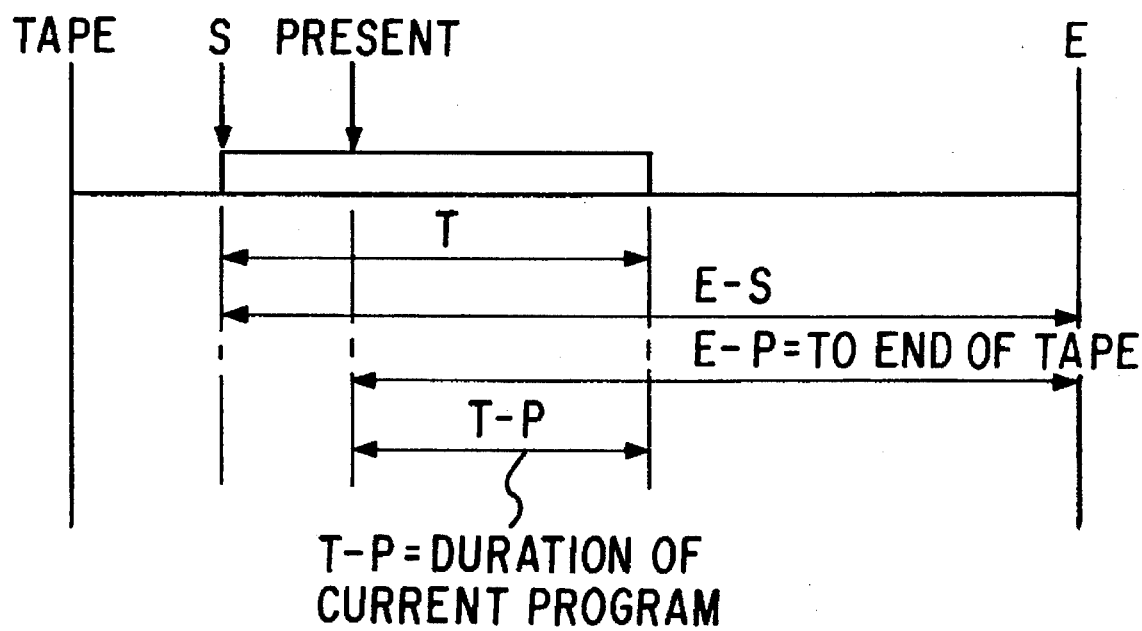
FIG. 4 is explanation diagrams showing examples for calculating various remaining length of tape in accordance with this invention.

FIG. 4 is explanation diagrams showing examples for calculating various remaining length of tape, wherein the remaining length information is generated from the microcomputer 20 using the code-signal loaded on the reproduction video signal and the output signal of the tape remaining length detection part 10.

Where a starting point of a program is S, a length from the starting point to an end of a program is T. A physical end of the tape is E, and the point of the tape accessed at the present time is P. A remaining period of time from the starting point of a program to the physical end of the tape is E-S, the remaining period of time from the present tape reproduction point to the end of the tape is E-P, and the remaining reproduction length from the present tape reproduction point to the end of a program is T-P start time and end time and period of a program can be obtained from the data of timer prerecording.

As explained herein, in accordance with this invention, it is possible to record a time information of a record length of a program mixed with video signals at a preset point when video signals are recorded on tape, and when reproduced, the time information can be detected and read to obtain the remaining reproduction length, which length can be displayed on a monitor by mixing with the video signals at a preset displaying point. It can offer a convenience to user by displaying the remaining length of a reproduction.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A device for recording and reading a remaining time of a program recorded on a VCR tape comprising:

means for detecting a program remaining length from a present position to an end of the program;

means for generating a key signal representative of one of recording or reproducing;

a microcomputer responsive to said key signal for generating a switching control signal, and a code signal representative of a recording period of time;

means responsive to said switching control signal and including a first switching part for selecting a source of video signals to be recorded or a source of video signals to be reproduced;

a mixer means for mixing said code signal and the video signals selected by the first switching part to generate mixed output signals;

means responsive to said switching control signal and including a second switching part for selecting one output terminal of two output terminals to transmit said mixed output signals;

means including a record processing part connected to one of said output terminals for processing and recording said mixed output signals on the tape;

means including a monitor connected to the other of said output terminals for displaying said mixed output signals;

means including a reproduction processing part for reproducing the mixed output video signals recorded as being said source of video signals to be reproduced;

means including a horizontal synchronization signal detection part for sampling video signals after an Nth horizontal synchronization signal of the video signals reproduced in the reproduction processing part;

means including a decoder part for reading the video signals sampled in the horizontal synchronization signal detection part;

means including a synchronization separation part for detecting vertical synchronization signals and horizontal synchronization signals of the video signals transmitted from the mixer part;

means including a control signal generation part connected to said synchronization separation part for generating a control signal on incoming of the Nth horizontal synchronization signal after the vertical synchronization signal;

means including a delaying part for delaying the control signal of the control signal generation part for a preset period of time; and means including a third switching part responsive to said switching control signal for selecting a control signal directly from the control signal generation part or a control signal delayed by the delaying part and for transmitting the selected control signal to the microcomputer.

2. The device as claimed in claim 1, wherein information signals of the microcomputer mixed in the mixer means corresponds to code signals corresponding to a recording period of time in recording of the tape.

3. The device as claimed in claim 2, wherein an information signal of the microcomputer mixed in the mixer part is determined according to a code signal, a remaining length detection signal of the tape remaining length detection part, and the present tape position signal.

4. The device as claimed in claim 3, wherein the information signal is a signal corresponding to a remaining period of time from the initial reproduction starting position to an end of the reproduction.

5. The device as claimed in claim 3, wherein the information signal is a signal corresponding to a remaining period of time from the present tape position to the end of the tape.

6. The device as claimed in claim 3, wherein the information signal is a signal corresponding to a remaining period of time from the present tape position to an end of a recorded portion.

* * * * *